(12) United States Patent
Hartmann

(10) Patent No.: US 8,746,981 B2
(45) Date of Patent: Jun. 10, 2014

(54) SYSTEM, METHOD AND APPARATUS FOR BEARINGS AND TOLERANCE RINGS WITH FUCTIONAL LAYERS

(75) Inventor: Juergen Hartmann, Willich (DE)

(73) Assignee: Saint-Gobain Performance Plastics Pampus, GmbH, Willich (DE)

( * ) Notice: Subject to any disclaimer, the term of this patent is extended or adjusted under 35 U.S.C. 154(b) by 312 days.

(21) Appl. No.: 12/971,025

(22) Filed: Dec. 17, 2010

(65) Prior Publication Data

US 2011/0150377 A1 Jun. 23, 2011

Related U.S. Application Data

(60) Provisional application No. 61/287,733, filed on Dec. 18, 2009.

(51) Int. Cl.
  *F16C 27/00* (2006.01)
  *F16C 33/02* (2006.01)
  *F16C 33/20* (2006.01)
  *F16B 2/22* (2006.01)

(52) U.S. Cl.
  USPC ............ 384/215; 384/276; 384/297; 403/372

(58) Field of Classification Search
  USPC ......... 384/26, 37, 38, 42, 103, 106, 129, 192, 384/202, 215, 219, 220, 221, 222, 276, 297, 384/300, 901; 403/367, 371, 372
  See application file for complete search history.

(56) References Cited

U.S. PATENT DOCUMENTS

| | | | |
|---|---|---|---|
| 629,395 A | 7/1899 | Sargent | |
| 2,159,327 A * | 5/1939 | Hendrick | 384/222 |
| 2,357,106 A | 8/1944 | Grenot | |
| 2,733,108 A | 1/1956 | Cowles | |
| 3,033,623 A | 5/1962 | Thomson | |
| 3,206,264 A | 9/1965 | Dalzell et al. | |
| 3,348,887 A | 10/1967 | Sheps | |
| 3,447,846 A | 6/1969 | Marsh | |
| 3,501,360 A | 3/1970 | Mancel | |
| 3,899,227 A | 8/1975 | Harig | |
| 4,084,863 A * | 4/1978 | Capelli | 384/300 |
| 4,111,499 A | 9/1978 | McCloskey | |

(Continued)

FOREIGN PATENT DOCUMENTS

| BE | 534482 A | 1/1955 |
|---|---|---|
| DE | 20200500686 U1 | 8/2006 |

(Continued)

OTHER PUBLICATIONS

International Search Report of App. No. PCT/EP2011/050658 (2 pgs.).

(Continued)

*Primary Examiner* — Marcus Charles
*Assistant Examiner* — Adam D Rogers
(74) *Attorney, Agent, or Firm* — Abel Law Group, LLP; Chi Suk Kim

(57) ABSTRACT

The present invention pertains to a bearing or tolerance ring having multiple functional layers including an annular metallic band and an elastomeric layer. The tolerance ring also includes a low friction layer that is bonded to the other layers. The elastomeric layer of the present invention provides soft performance to reduce noise and vibration without diminishing performance.

21 Claims, 2 Drawing Sheets

(56) References Cited

U.S. PATENT DOCUMENTS

| | | | |
|---|---|---|---|
| 4,358,167 A | 11/1982 | Magazian et al. | |
| 4,846,590 A | 7/1989 | Teramachi | |
| 5,125,755 A | 6/1992 | Adler et al. | |
| 5,127,218 A | 7/1992 | Schiesser et al. | |
| 5,229,198 A | 7/1993 | Schroeder | |
| 6,148,491 A | 11/2000 | Bartocci | |
| 6,390,682 B1 | 5/2002 | McMeekin et al. | |
| 6,416,226 B1 | 7/2002 | Provence et al. | |
| 6,425,977 B2 | 7/2002 | McDonald et al. | |
| 6,478,468 B2 | 11/2002 | McMeekin et al. | |
| 6,480,363 B1 | 11/2002 | Prater | |
| 6,485,608 B1 | 11/2002 | McDonald et al. | |
| 7,717,407 B2 * | 5/2010 | Welsch | 267/140.12 |
| 7,832,933 B2 * | 11/2010 | Adams et al. | 384/103 |
| 7,942,581 B2 * | 5/2011 | Leonardelli | 384/276 |
| 8,021,072 B2 * | 9/2011 | Court et al. | 403/372 |
| 8,118,492 B2 | 2/2012 | Weiden et al. | |
| 2004/0057643 A1 | 3/2004 | Blanchard et al. | |
| 2005/0070365 A1 | 3/2005 | Riefe et al. | |
| 2006/0251887 A1 * | 11/2006 | Welsch | 428/339 |
| 2006/0276246 A1 * | 12/2006 | Needes et al. | 464/30 |
| 2009/0180720 A1 | 7/2009 | Weiden et al. | |
| 2009/0256341 A1 | 10/2009 | Okada et al. | |
| 2011/0150375 A1 | 6/2011 | Jaeger et al. | |
| 2011/0176757 A1 | 7/2011 | Heldmann et al. | |

FOREIGN PATENT DOCUMENTS

| | | | |
|---|---|---|---|
| EP | 0656252 | A1 | 6/1995 |
| EP | 1305530 | B1 | 5/2003 |
| EP | 1754646 | A2 | 2/2007 |
| GB | 821472 | A | 10/1959 |
| GB | 2136063 | A | 9/1984 |
| GB | 2260338 | A * | 4/1993 |
| JP | S6113025 | A | 1/1986 |
| JP | S63187747 | A | 8/1988 |
| JP | H04236815 | A | 8/1992 |
| JP | 06017820 | A * | 1/1994 |
| JP | H0635643 | U | 5/1994 |
| JP | H11115773 | A | 4/1999 |
| WO | 2005/105431 | | 11/2005 |
| WO | 2007125928 | A1 | 11/2007 |
| WO | 2010/038137 | | 4/2010 |
| WO | 2011073412 | A1 | 6/2011 |
| WO | 2011073413 | A1 | 6/2011 |
| WO | 2011089145 | A1 | 7/2011 |

OTHER PUBLICATIONS

International Search Report of App. No. PCT/EP2010/070124 (2 pgs.).
International Search Report of App. No. PCT/EP2010/070123 (2 pgs.).
The International Search Report and the Written Opinion for International Application No. PCT/EP2011/050658 received from the European Patent Office, dated Apr. 29, 2011, 14 pages.
The International Preliminary Report on Patentability for International Application No. PCT/EP2010/070124 received from the International Bureau of WIPO, dated Jun. 28, 2012, 8 pages.
The International Search Report and the Written Opinion for International Application No. PCT/EP2010/070123 received from the European Patent Office, dated Mar. 2, 2011, 18 pages.

* cited by examiner

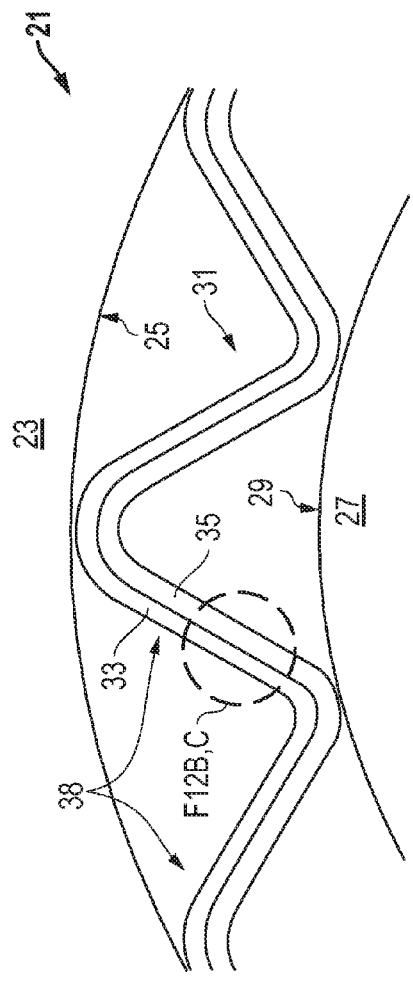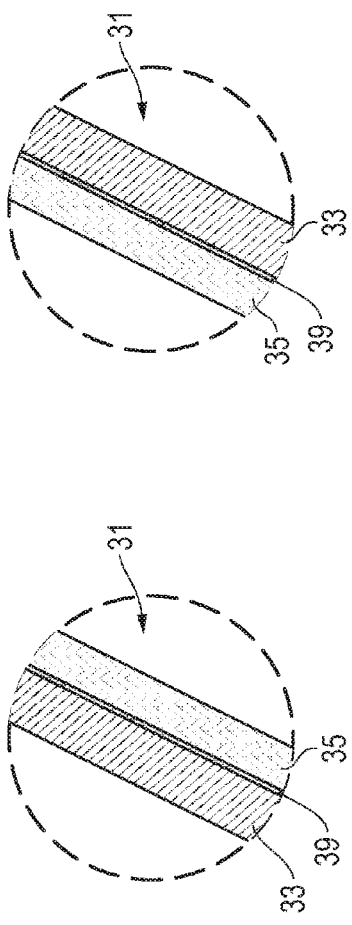

SYSTEM, METHOD AND APPARATUS FOR BEARINGS AND TOLERANCE RINGS WITH FUCTIONAL LAYERS

CROSS-REFERENCE TO RELATED APPLICATIONS

This application claims priority to and the benefit of U.S. Prov. Pat. App. No. 61/287,733, filed on Dec. 18, 2009, and is incorporated herein by reference in its entirety.

FIELD OF THE DISCLOSURE

The invention relates in general to bearings and tolerance rings that are located between moving parts and, in particular, to an improved system, method and apparatus for a bearing or tolerance ring with functional layers.

BACKGROUND

Bearings and tolerance rings constrain movement between parts that move relative to each other, such as rotating shafts in housing bores. An example of such a structure is an annular band located in the gap between the outer surface of a shaft and the inner surface of a bore. This tolerance ring limits radial or axial motion of the shaft within the bore while still permitting relative movement.

In conventional designs, a close fit is sought between the inner and outer components. In addition, either forces for providing maximal frictional engagement or minimal variation in sliding forces are sought. A close fit between the components is desirable because it reduces relative vibration between the parts.

Tolerance rings are able to compensate for tolerances or misalignments, create torque and can improve other properties, such as noise, vibration and harshness (NVH) properties. Torque and even NVH are mainly influenced by the material properties of common tolerance rings, which are usually formed only from stainless or carbon steel. These requirements between the inner and outer components require strong and substantial contact, which increases frictional forces. Although these solutions are workable for some applications, improvements in bearings and tolerance rings continue to be of interest.

SUMMARY OF THE INVENTION

Embodiments of a system, method and apparatus for bearings and tolerance rings with functional layers are disclosed. In some versions, an assembly comprises an outer component, an inner component located in the outer component that is movable relative thereto, and a tolerance ring or bearing mounted between the inner and outer components. The tolerance ring or bearing may comprise a metallic annular band and an elastomeric layer secured to the metallic layer.

In other embodiments, the assembly further comprises a low friction layer on at least one of the annular band and the elastomeric layer. The annular band may be formed from spring steel and the low friction layer may be laminated to at least one side of the annular band to improve sliding properties of the tolerance ring. The low friction layer may be located on the annular band opposite the elastomeric layer. The low friction layer may comprise PTFE and be bonded to the annular band or the elastomeric layer. The assembly may further comprise an adhesive or primer layer between the annular band and the elastomeric layer.

BRIEF DESCRIPTION OF THE DRAWINGS

The present disclosure may be better understood, and its numerous features and advantages made apparent to those skilled in the art by referencing the accompanying drawings.

FIGS. 1A, B and C are sectional side views of other embodiments of a tolerance ring constructed in accordance with the invention;

The use of the same reference symbols in different drawings indicates similar or identical items.

DETAILED DESCRIPTION

Figure 2:
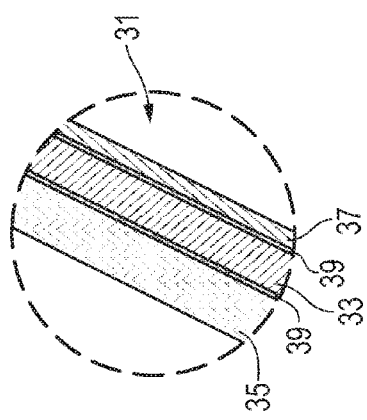
FIG. 2 is a sectional side view of another embodiment of a tolerance ring constructed in accordance with the invention.
Figure 3A:
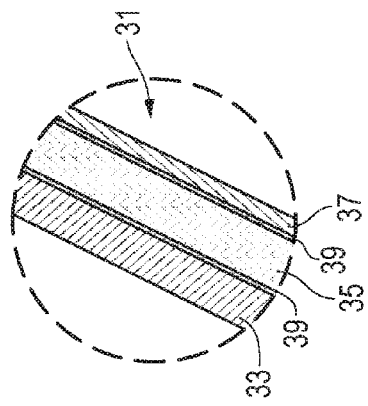
FIGS. 3A, B and C are sectional side views of still other embodiments of a tolerance ring constructed in accordance with the invention.
Figure 3B:
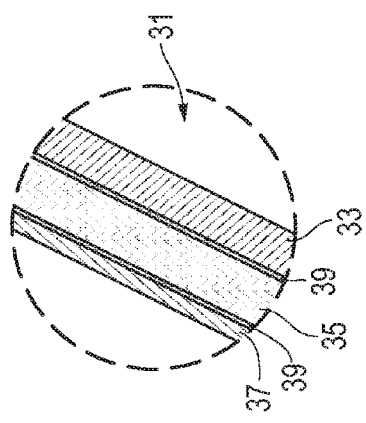
Figure 3C:
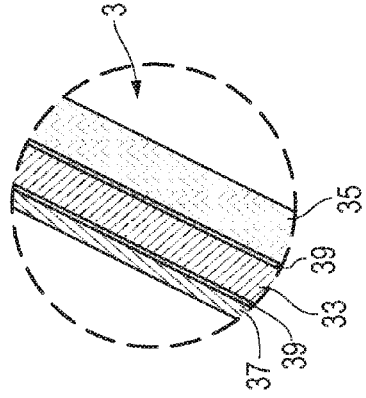

Embodiments of a system, method and apparatus for bearings and tolerance rings with functional layers are disclosed in FIGS. 1-3. For example, the illustrations depict a tolerance ring assembly 21 comprising an outer component 23 having a bore 25 with an axis therein. An inner component 27 is mounted in the bore 25 of the outer component 23 and has an outer surface 29. The inner component 27 mates with the outer component 23 and is movable relative thereto.

A bearing or tolerance ring 31 is located in the bore 25 between the inner and outer components 23, 27. The bearing or tolerance ring 31 is configured with a plurality of waves 38 (e.g., three shown in FIG. 1A). The peaks and valleys of the waves 38 undulate between the outer and inner components 23, 27 and contact their respective surfaces 25, 29 as shown.

The tolerance ring 31 comprises an annular band 33 formed from a metallic material, an elastomeric layer 35 on the annular band 33, and a low friction layer 37 (FIG. 13) on at least one of the annular band 33 and the elastomeric layer 35. The annular band 33 may be formed from spring steel and the low friction layer 37 may be laminated to at least one side of the annular band.

The low friction layer 37 may be located on the annular band 33 opposite the elastomeric layer 35, as shown in FIG. 13. The low friction layer 37 may comprise PTFE and be bonded with a glue or adhesive 39 to one of the annular band 33 and the elastomeric layer 35. The elastomeric layer may comprise, for example, nitrile rubber, olefinic elastomeric, polyether-/polyester-elastomeric, ethylene-propylene-elastomeric, ethylene-acrylic rubber and fluoro elastomeric materials. The adhesive 39 also may comprise a primer between the annular band 33 and the elastomeric layer 35, and between the low friction layer 37 and the annular band and/or elastomeric layer.

The embodiments disclosed herein have significant advantages over conventional solutions. For example, the combination of a bearing or tolerance ring and an elastomeric backing improves the design of tolerance rings with softer performance. The term soft is used in terms of providing torque at a lower level with less variation. In terms of NVH, these materials significantly decouple the two mating parts that are connected by the tolerance ring without diminishing other areas of performance. As a result, these designs significantly reduce noise and vibration.

In another example, a metallic material with spring behavior is coated with an adhesive and/or primer and combined with an elastomeric layer to form a composite material. The metal may comprise, e.g., stainless steel, carbon steel or other resilient metals. The elastomeric material may comprise, e.g., nitrile rubber, neoprene rubber, silicone rubber, olefinic elastomeric, polyether-/polyester-elastomeric, ethylene-propylene-elastomeric, ethylene-acrylic rubber and/or fluoro elastomeric. In other embodiments, the tolerance ring may comprise an inner metallic layer and an external elastomeric layer.

In other embodiments, a sliding or low friction layer is added to the structure. These designs improve the sliding properties of the tolerance compensating element. For example, the low friction material may comprise PTFE on the elastomeric layer, and/or even on the metal side opposite to the elastomeric layer. Like the elastomeric layer, the low friction layer also may be bonded to the tolerance ring (e.g., either the metallic or elastomeric layer) with an adhesive or glue.

In still other embodiments, a resilient metallic layer is laminated with a low friction material. The metal surface may then be coated with an adhesive and/or primer and combined with one or more elastomeric layers to form a composite material. Other combinations also are possible.

Both the composition and the production method are different from a conventional sliding bearing, and also different from a conventional tolerance ring. With the described embodiments several different functions are provided. These embodiments act as a sliding bearing or tolerance ring with additional tolerance compensation, a defined torque can be applied, and they work as tolerance rings with improved friction properties. Compared to conventional designs, embodiments of the tolerance ring have advanced sliding properties, and embodiments of the bearing have advanced spring and adjustment properties.

General applications for embodiments of this composite structure may be used to produce sliding bearings for clearance-free or clearance-reduced applications, or to produce tolerance rings with low retention force. The metallic core formed from spring steel acts as a spring and thus provides the tolerance adjustment between the bearing surface and, e.g., a shaft by using the low friction compound-coated spring waves.

The low friction layer may engage only the functional side of the shaft or counterpart. Alternatively, it may engage both components, and/or provide a retention force needed between the mating components. The low friction layer allows the composite structure to work as a sliding bearing or provide a relatively low retention force due to the intrinsic low coefficient of friction of the low friction material.

The tolerance ring may provide sliding force control (e.g., axial or rotational) when used between mating components such as steering column lock mechanisms. The tolerance ring prevents overload by allowing rotation between components once a threshold torque level has been reached. For example, in steering column energy absorption systems, a tolerance ring allows axial slippage to occur once an axial force level is reached.

In general, waves having a lower stiffness generate a low torque bearing and higher stiffness waves generate higher torques, such as for door hinge applications. These types of performance may be achieved by designing the tolerance ring waves to have spring characteristics that generate the correct level of radial force that, when combined with the friction characteristics of the assembly, produce the desired sliding force levels.

The elastic/plastic nature of the wave spring characteristics is used to limit the force variation experienced across the typical dimensional tolerances of the assembly. This maintains a reasonably consistent sliding force. Manipulation of forces is achieved by design of wave geometry, material thickness and hardness. To cope with component dimensional tolerances, the tolerance ring waves are typically designed to be compressed by an amount greater than the tolerance on the clearance in which the waves are installed.

A limitation exists where relatively low sliding or rotational force levels are required (such as in steering column adjustment mechanisms), or where the tolerance ring acts as a pivot bush. In these applications forces are generally too high and radial stiffness too low. It is possible to reduce the stiffness of the tolerance ring waves to limit maximum forces, but this can result in assemblies with low radial load-carrying capability. Even with relatively low stiffness waves the sliding force level produced may be too high.

In other embodiments, the low friction layer may comprise materials including, for example, a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a thermoplastic fluoropolymer, a polyamide, a polybenzimidazole, or any combination thereof.

In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof.

In a further example, the material includes polyketone, such as polyether ether ketone (PEEK), polyether ketone, polyether ketone ketone, polyether ketone ether ketone, a derivative thereof, or a combination thereof. An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. In an additional example, the thermoplastic polymer may be ultra high molecular weight polyethylene.

Lubrication of the sliding surface (e.g., with oil or grease) may be used in high force applications. Exemplary solid lubricants may include molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof.

A combination of the spring characteristics of the tolerance ring-type core with the low friction/lubrication characteristics of a low friction compound-based outer surface provides a lower friction sliding interface. This design enables tolerance rings to be designed to operate on a higher torque level for sliding bearing applications, and over wider clearances with higher radial load strength and lower sliding forces than are possible with conventional tolerance rings.

Applications for such embodiments include, for example, hinge assemblies for portable electronics such as laptop computers and cellular telephones. These applications require hinge mechanisms that provide a low retention force at a well-defined torque over the lifetime of the product. Traditional bearings do provide a low retention force as well as a well-defined initial torque. However, with the invention, the torque value may be kept relatively constant over the product lifetime due to the spring adjust function of the spring steel waves combined with low wear of the low friction layer. In contrast, traditional tolerance rings provide a strong retention force but with high friction.

This written description uses examples, including the best mode, and also to enable those of ordinary skill in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. An assembly, comprising:
    an outer component having a bore;
    an inner component mounted in the bore of the outer component, such that the inner component mates with the outer component and is movable relative thereto;
    a ring located in the bore between the inner component and the outer component, the ring making contact with the inner component and the outer component, the ring further comprising:
       an annular band formed from a metallic material;
       an elastomeric layer on the annular band, wherein the elastomeric layer contacts one of the outer component and the inner component; and
       a polymeric layer on the annular band.

2. An assembly according to claim 1, wherein the polymeric layer is laminated to at least one side of the annular band.

3. An assembly according to claim 1, wherein the polymeric layer is on the annular band opposite the elastomeric layer.

4. An assembly according to claim 1, wherein the polymeric layer comprises a fluoropolymer.

5. An assembly according to claim 1, further comprising an adhesive or primer layer between the annular band and the elastomeric layer, and between the polymeric layer and the annular band.

6. An assembly according to claim 1, wherein the annular band is formed from spring steel, and the polymeric layer comprises PTFE.

7. An assembly according to claim 1, wherein the elastomeric layer comprises one of nitrile rubber, olefinic elastomeric, polyether-/polyester-elastomeric, ethylene-propylene-elastomeric, ethylene-acrylic rubber and fluoro elastomeric materials.

8. An assembly according to claim 1, wherein the ring is one of a bearing and tolerance ring.

9. An assembly according to claim 1, wherein the assembly further comprises a lubrication disposed between the ring and one of the outer component and the inner component.

10. An assembly according to claim 9, wherein the lubrication is disposed between the polymeric layer and one of the outer component and the inner component.

11. An assembly according to claim 9, wherein the lubrication comprises a solid lubricant.

12. An assembly, comprising:
    an outer component having a bore;
    an inner component mounted in the bore of the outer component, such that the inner component mates with the outer component and is movable relative thereto;
    a ring located in the bore between the inner component and the outer component, the ring making contact with the inner component and the outer component, the ring further comprising:
       an annular band formed from a metallic material;
       an elastomeric layer adhered to the annular band; and
       a polymeric layer adhered to the annular band.

13. An assembly according to claim 12, wherein the polymeric layer is laminated to at least one side of the annular band.

14. An assembly according to claim 12, wherein the polymeric layer is on the annular band opposite the elastomeric layer.

15. An assembly according to claim 12, wherein the polymeric layer comprises a fluoropolymer.

16. An assembly according to claim 12, wherein the annular band is formed from spring steel, and the polymeric layer comprises PTFE.

17. An assembly according to claim 12, wherein the elastomeric layer comprises one of nitrile rubber, olefinic elastomeric, polyether-/polyester-elastomeric, ethylene-propylene-elastomeric, ethylene-acrylic rubber and fluoro elastomeric materials.

18. An assembly according to claim 12, wherein the ring is one of a bearing and tolerance ring.

19. An assembly according to claim 12, wherein the assembly further comprises a lubrication disposed between the ring and one of the outer component and the inner component.

20. An assembly according to claim 19, wherein the lubrication is disposed between the polymeric layer and one of the outer component and the inner component.

21. An assembly according to claim 19, wherein the lubrication comprises a solid lubricant.

\* \* \* \* \*